(12) United States Patent
Ding et al.

(10) Patent No.: US 11,638,323 B2
(45) Date of Patent: Apr. 25, 2023

(54) DISCONTINUOUS RECEPTION COMMAND OVER SIDELINK

(71) Applicant: QUALCOMM Incorporated, San Diego, CA (US)

(72) Inventors: Ling Ding, Chester, NJ (US); Sony Akkarakaran, Poway, CA (US); Jung Ho Ryu, Fort Lee, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/152,274

(22) Filed: Jan. 19, 2021

(65) Prior Publication Data

US 2021/0259042 A1    Aug. 19, 2021

Related U.S. Application Data

(60) Provisional application No. 62/976,704, filed on Feb. 14, 2020.

(51) Int. Cl.
| | |
|---|---|
| *H04W 76/28* | (2018.01) |
| *H04W 72/02* | (2009.01) |
| *H04W 72/1263* | (2023.01) |
| *H04W 80/02* | (2009.01) |
| *H04W 24/08* | (2009.01) |
| *H04W 72/20* | (2023.01) |

(52) U.S. Cl.
CPC ............ *H04W 76/28* (2018.02); *H04W 24/08* (2013.01); *H04W 72/02* (2013.01); *H04W 72/1263* (2013.01); *H04W 72/20* (2023.01); *H04W 80/02* (2013.01)

(58) Field of Classification Search
CPC . H04W 24/08; H04W 72/02; H04W 72/0406; H04W 72/1263; H04W 76/14; H04W 76/28; H04W 80/02; H04W 72/20
See application file for complete search history.

(56) References Cited

U.S. PATENT DOCUMENTS

| | | | | |
|---|---|---|---|---|
| 2019/0174411 | A1* | 6/2019 | Xu | H04W 72/0406 |
| 2020/0296668 | A1* | 9/2020 | Xu | H04W 72/0406 |
| 2021/0227465 | A1* | 7/2021 | Kung | H04W 72/566 |
| 2021/0227622 | A1* | 7/2021 | Kung | H04W 76/28 |
| 2022/0159679 | A1* | 5/2022 | Park | H04W 72/1263 |

* cited by examiner

*Primary Examiner* — Kan Yuen
(74) *Attorney, Agent, or Firm* — ArentFox Schiff LLP

(57) ABSTRACT

Example implementations include a method, apparatus and computer-readable medium of wireless communication. A user equipment (UE) may determine, based on a sidelink resource configuration from a base station, a physical sidelink control/shared channel (PSCCH/PSSCH) occasion to monitor for a sidelink transmission from a second UE. The UE may receive, during the PSCCH/PSSCH occasion, a signal indicative of a sidelink discontinuous reception (DRX) command. The UE may determine to stop monitoring the PSCCH for the PSCCH/PSSCH occasion in response to the sidelink DRX command.

29 Claims, 10 Drawing Sheets

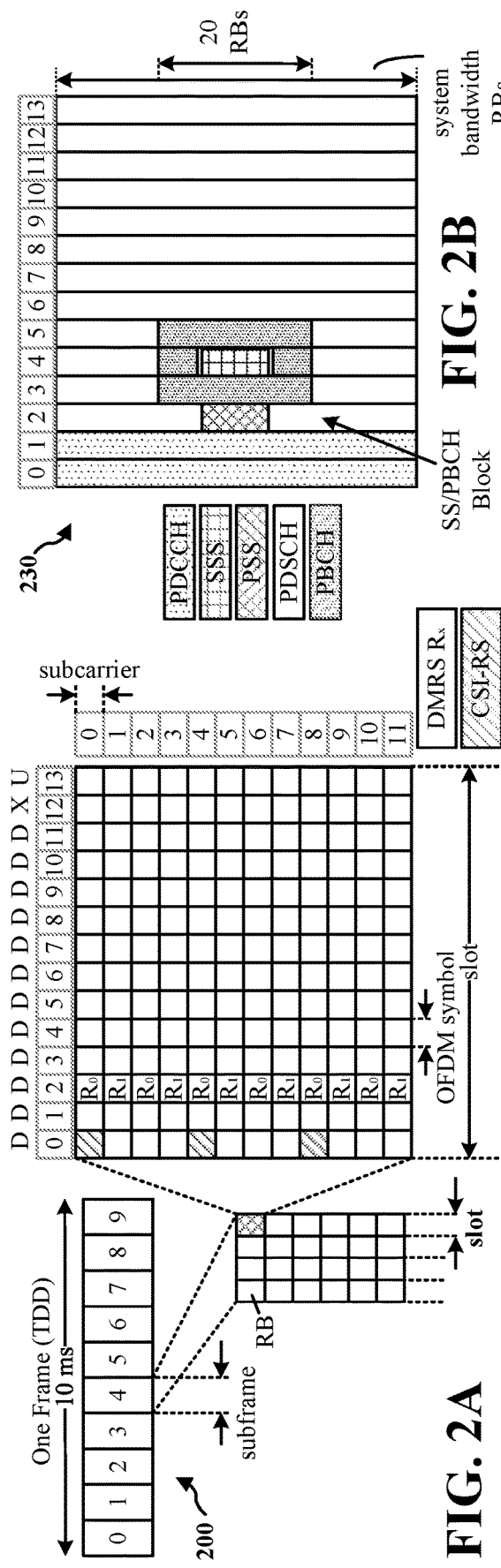
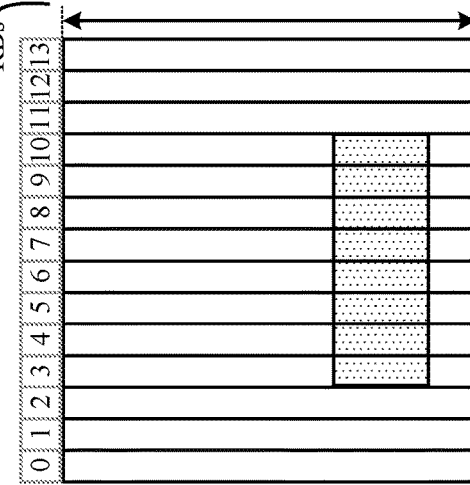
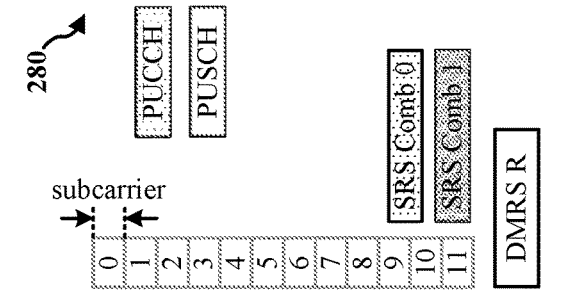
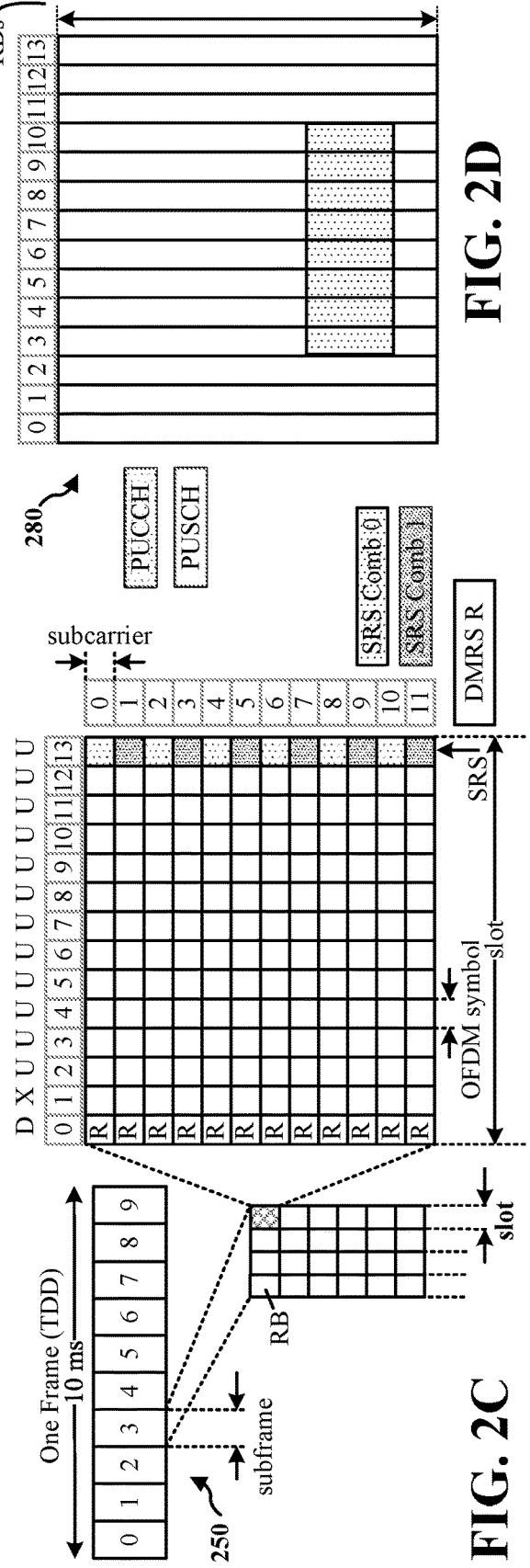

DISCONTINUOUS RECEPTION COMMAND OVER SIDELINK

CROSS REFERENCE TO RELATED APPLICATIONS

This application claims priority to U.S. Provisional Application No. 62/976,704 titled "DISCONTINUOUS RECEPTION COMMAND OVER SIDELINK," filed Feb. 14, 2020, which is assigned to the assignee hereof, and incorporated herein by reference in its entirety.

BACKGROUND

Technical Field

The present disclosure relates generally to communication systems, and more particularly, to apparatuses and methods of discontinuous reception (DRX) for sidelink operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first receiving user equipment (UE). The method may include identifying, based on a sidelink resource configuration from a base station, a physical sidelink control/shared channel (PSCCH/PSSCH) occasion to monitor for a sidelink transmission from a second UE. The method may include receiving, during the PSCCH/PSSCH occasion, a sidelink discontinuous reception (DRX) command. The method may include stopping monitoring of the PSCCH for the PSCCH/PSSCH occasion in response to the sidelink DRX command.

In another aspect, the disclosure provides a method of wireless communication for a first transmitting UE. The method may include identifying, based on a sidelink resource configuration from a base station, a PSCCH/PSSCH occasion for a second UE. The method may include determining, during the PSCCH/PSSCH occasion that the first UE has no data to transmit to the second UE. The method may include transmitting a sidelink DRX command in response to determining that the UE has no data to transmit to the second UE.

The disclosure also provides apparatuses (e.g., a user equipment) including a memory storing computer-executable instructions and at least one processor configured to execute the computer-executable instructions to perform one or both of the above methods, apparatuses including means for performing one or both of the above methods, and a computer-readable medium storing computer-executable instructions for performing one or both of the above methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
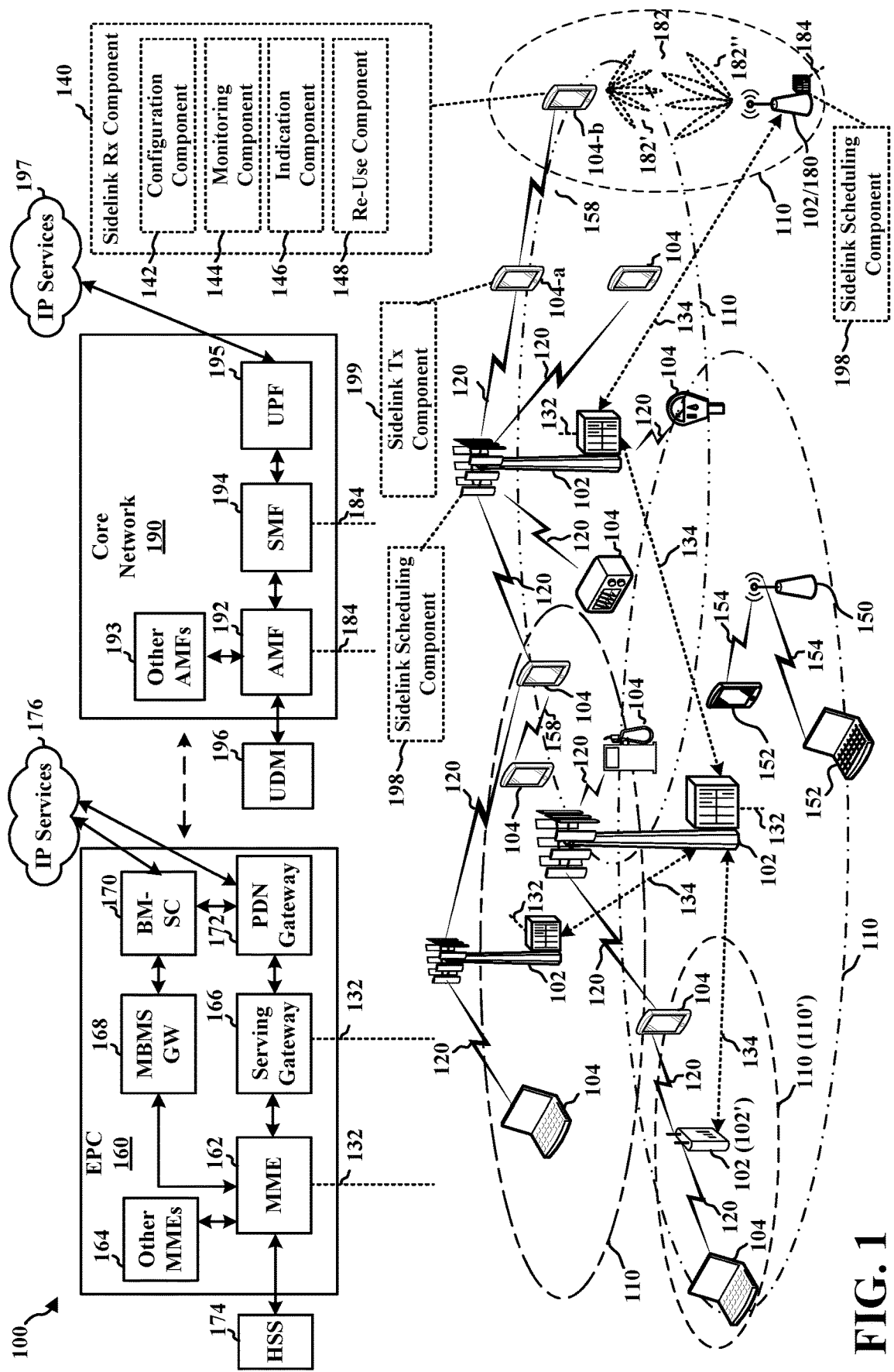
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) in communication with another device (e.g., a base station) may actively monitor a control channel (e.g., a physical downlink control channel (PDCCH)) for a grant scheduling a transmission. When the UE is not actively receiving data, the UE may conserve power by entering a discontinuous reception mode (DRX) in which the UE monitors the control channel during a DRX active time (including an on duration of a DRX cycle) and may enter a sleep mode during a DRX inactive time (i.e., an off portion of the DRX cycle). That is, the UE may not monitor the control channel during the DRX inactive time (i.e., the off portion of the DRX cycle), and the base station may avoid transmitting the control channel to the UE during the DRX active time (i.e., the off portion of the DRX cycle). In addition, the base station may transmit a DRX command to cause the UE to enter a DRX inactive state and start the DRX cycles, which may conserve power further.

The described features generally relate to synchronization signals for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to user equipment (UE)). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link.

A UE may be configured for mode 2 sidelink scheduling in which the base station (e.g., gNB) may configure physical sidelink control channel (PSCCH)/physical sidelink shared channel (PSSCH) occasions on which the UE is to monitor a PSCCH for a sidelink grant from a second UE for receiving the PSSCH. The second UE may be configured with transmission resources corresponding to the PSCCH/PSSCH occasions. When the second UE has data to transmit to the first UE, the second UE may autonomously schedule a sidelink transmission using the PSCCH/PSSCH occasions. Hybrid automatic repeat request (HARQ) acknowledgments for sidelink communications may be transmitted either via the Uu link to the base station or via the sidelink (e.g., on a physical sidelink feedback channel (PSFCH). Due to the differences between Uu link and sidelink communications, DRX procedures for the Uu link may not be sufficient for the sidelink.

In an aspect, the present disclosure provides for DRX configurations and procedures for sidelink communications using mode 2 scheduling and a sidelink DRX command. A first UE may receive, from a base station, a sidelink resource configuration indicating PSCCH/PSSCH occasions on which to monitor the PSCCH for a grant from a second UE for the PSSCH. Similarly, the second UE may receive transmit resources corresponding to the PSCCH/PSSCH occasions for transmitting the PSCCH and PSSCH. During a PSCCH/PSSCH occasion, the second UE may not have data to send to the first UE. The second UE may transmit a sidelink DRX command in response to determining that the second UE has no data to transmit to the first UE. The first UE may determine to stop monitoring the PSCCH for the PSCCH/PSSCH occasion in response to the sidelink DRX command. Accordingly, the first UE may conserve power, for example, by entering a sleep mode instead of monitoring the PSCCH.

In some aspects, the first UE may re-use the PSCCH/PSSCH occasion. For example, the first UE may transmit a scheduling request (SR) to the base station to initiate an uplink transmission on the PSCCH/PSSCH resources. As another example, if the first UE is in a DRX active state for the link with the base station, the first UE may inform the second UE of a duration of the DRX active state such that the second UE may transmit new data that arrives during the PSCCH/PSSCH occasion.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink receive (Rx) component 140 that controls discontinuous reception for sidelink communications. The sidelink Rx component 140 may include a configuration component 142 that receives, from a base station 102, a sidelink resource configuration indicating physical sidelink control channel PSCCH/PSSCH occasions on which to monitor a PSCCH for a sidelink grant from a second UE. The sidelink Rx component 140 may include a monitoring component 144 that monitors the PSCCH and stops monitoring the PSCCH in response to a sidelink DRX command. The sidelink Rx component 140 may include an indication component 146 that receives, during the PSCCH/PSSCH occasion, a signal indicative of a sidelink DRX command and triggers the monitoring component 144 to stop monitoring the PSCCH. The sidelink Rx component 140 may optionally include a re-use component 148 that transmits one or more messages to the base station 102 or another UE to use an unused portion of the PSCCH/PSSCH occasion.

Figure 6:
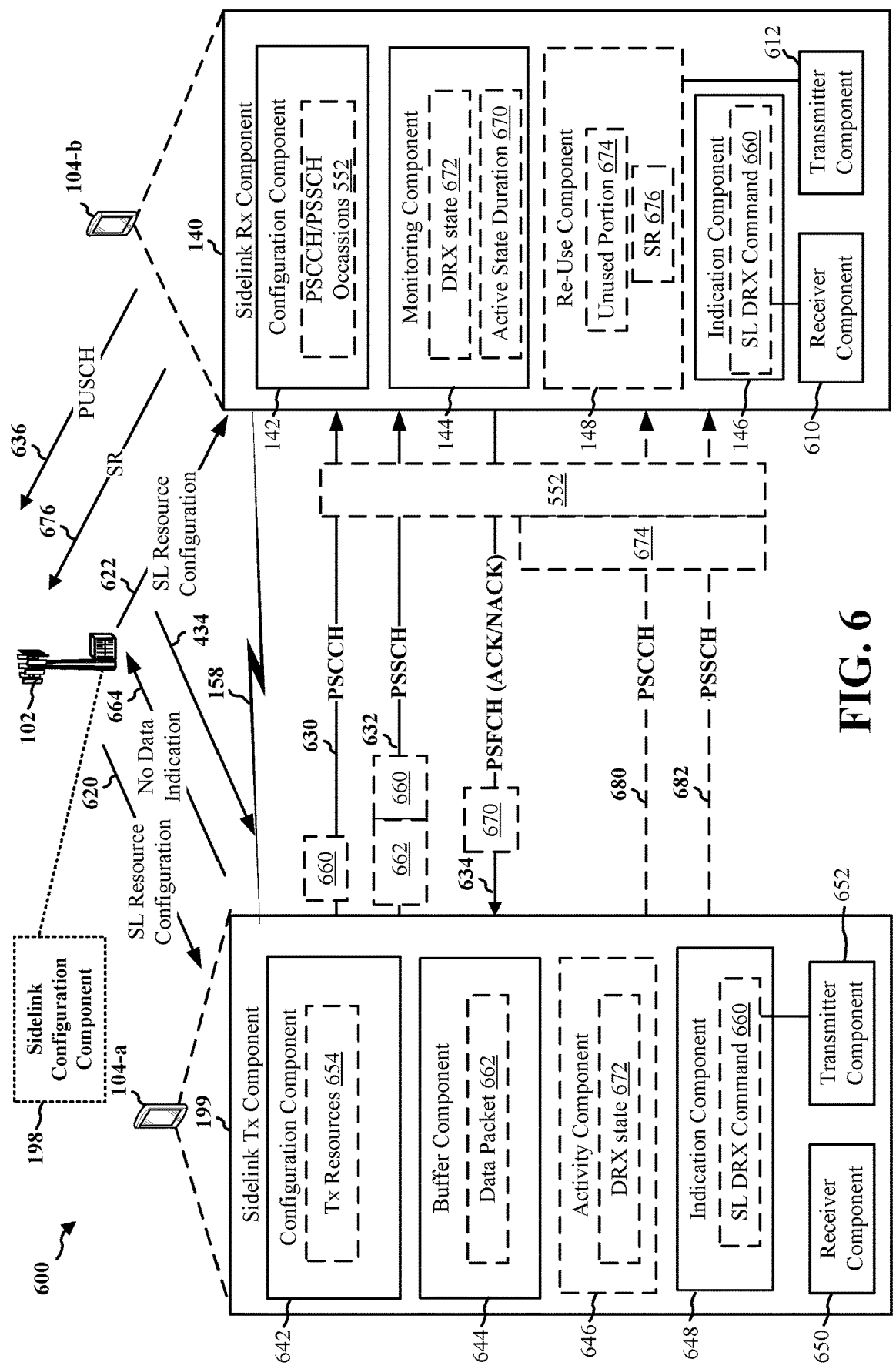
FIG. 6 is a diagram illustrating example communications and components of a base station, a first transmitting UE and a second receiving UE.

In an aspect, one or more of the UEs 104 (e.g., UE 104-a) may include a sidelink transmit (Tx) component 199 that transmits a sidelink DRX command when the UE 104 has no sidelink data to transmit during a PSCCH/PSSCH occasion. For example, as illustrated in FIG. 6, the sidelink TX component 199 may include a configuration component 642 that receives a sidelink resource configuration and determines the PSCCH/PSSCH occasion for a second UE. The sidelink Tx component 199 may include a buffer component 644 that buffers data packets and determines that the UE 104 has no data to transmit during a PSCCH/PSSCH occasion. The sidelink Tx component 199 may include an indication component 648 that transmits a sidelink DRX command in response to determining that the UE has no data to transmit during the PSCCH/PSSCH occasion. The sidelink Tx component 199 may optionally include an activity component 646 that tracks a DRX state of the UE 104 or another UE with a base station such that the UE 104 may transmit when both the UE 104 and the other UE are awake.

Returning to FIG. 1, in an aspect, one or more of the base stations 102 may include a sidelink configuration component 198 that is configured to transmit the sidelink resource configuration. Further, the sidelink configuration component 198 may receive a scheduling request from a UE indicating an unused portion of a PSCCH/PSSCH occasion and schedule an uplink transmission on unused resources of the PSCCH/PSSCH occasion.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 29 slots/subframe. The subcarrier spacing and symbol length/duration are a function of the numerology. The subcarrier spacing may be equal to 2*15 kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
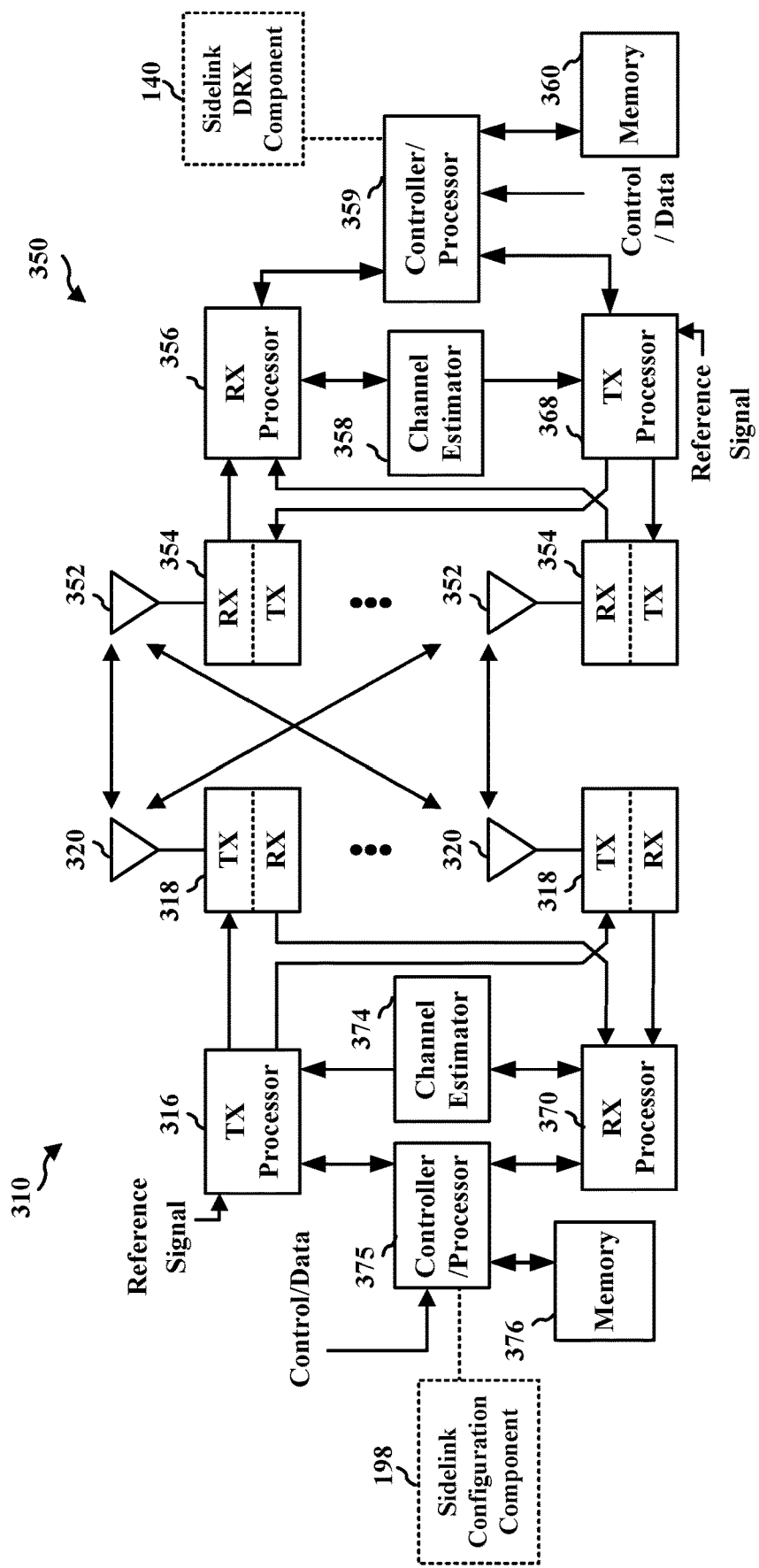
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink Rx component 140 and/or the sidelink Tx component 199 of FIG. 1.

At least one of the TX processor 316, the RX processor 370, and the controller/processor 375 may be configured to perform aspects in connection with the sidelink configuration component 198 of FIG. 1.

Figure 4:
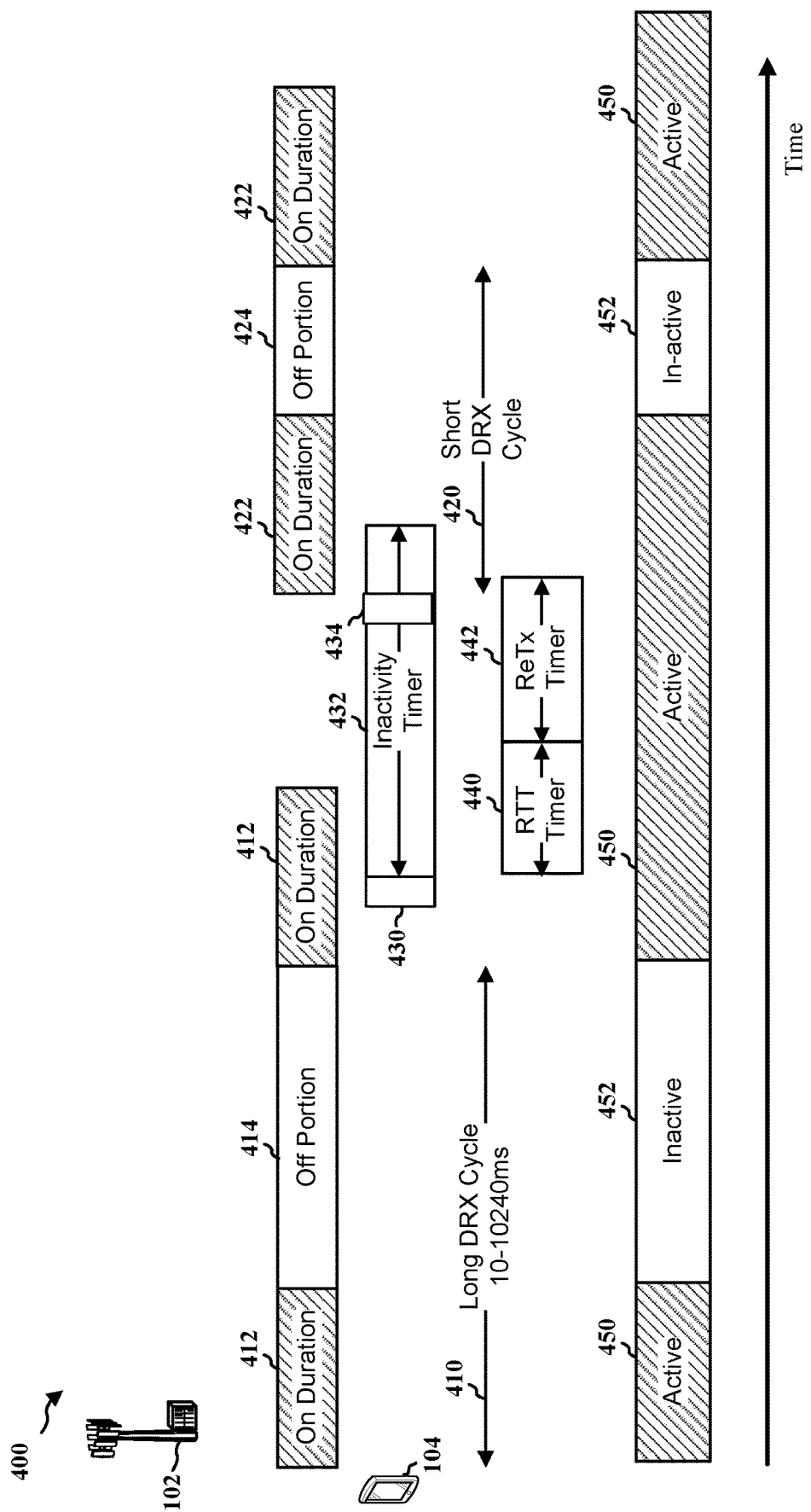
FIG. 4 is a timing diagram of an example of DRX operation for a link between a base station and a UE.

FIG. 4 is a diagram 400 illustrating an example of DRX operation for a Uu link between a base station 102 and a UE 104. The UE 104 may be configured with a long DRX cycle 410 and a short DRX cycle 420. For example, the long DRX cycle 410 may be 10-10240 ms. The long DRX cycle 410 may include an on duration 412 during which the UE 104 monitors a PDCCH for grants and an off portion 414 during which the UE 104 may not monitor the PDCCH for grants (e.g., where the UE 104 may enter a sleep mode). When the UE 104 receives a grant for a new transmission (e.g., grant 430), the UE 104 may start an inactivity timer 432. The inactivity timer 432 may be reset whenever a grant for a new transmission is received and the UE 104 may monitor the PDCCH for grants while the inactivity timer 432 is running. When the inactivity timer 432 expires, the UE 104 may start the short DRX cycle 420 including the on duration 422, which may be different than the on duration 412 of the long DRX cycle, and the off portion 424, which may be different than the off portion 414 of the long DRX cycle. Generally, the short DRX cycle 420 is configured to be shorter than the long DRX cycle 410.

The UE 104 may also start a round trip time (RTT) timer 440 for a HARQ process of the transmission. If the transmission is an uplink transmission, the RTT timer 440 may start at the end of the uplink transmission. If the transmission is a downlink transmission, the RTT timer 440 may start at the end of an ACK/NACK for the downlink transmission. The RTT timer 440 may measure an amount of time until the UE 104 is to monitor for a grant for a possible retransmission. The UE 104 may start a retransmission (ReTx) timer 442 to monitor a window during which a grant for the retransmission may be received. If the UE 104 receives a grant 430 for a retransmission, the UE 104 may start the RTT timer 440 again and monitor for a grant while the ReTx timer 442 is running. Because a grant for a retransmission does not restart the inactivity timer 432, the RTT timer 440 and/or the ReTx timer 442 may run while the UE 104 is in the short DRX cycle. The UE 104 may monitor for the retransmission grant during the short DRX cycle 420 even if the UE 104 is not in the on duration 422. The base station 102 may transmit a DRX command 434 that immediately starts a DRX cycle. In an aspect, if the UE 104 is configured with a short DRX cycle 420, the DRX command 434 may start the short DRX cycle 420. If the UE 104 is only configured with a long DRX cycle 410, the DRX command 434 may immediately start the long DRX cycle 410 from the DRX command 434. The DRX command 434 may be a long DRX command that may immediately start the long DRX cycle 410 even if the UE 104 is configured with a short DRX cycle.

The UE 104 may be in an active state 450 in which the UE 104 monitors the PDCCH when any of the long DRX on duration 412, short DRX on duration 422, inactivity timer 432, or ReTx timer 442 are running. The UE 104 may be in an inactive state 452 when none of the long DRX on duration 412, short DRX on duration 422, inactivity timer 432, or ReTx timer 442 are running.

Figure 5:
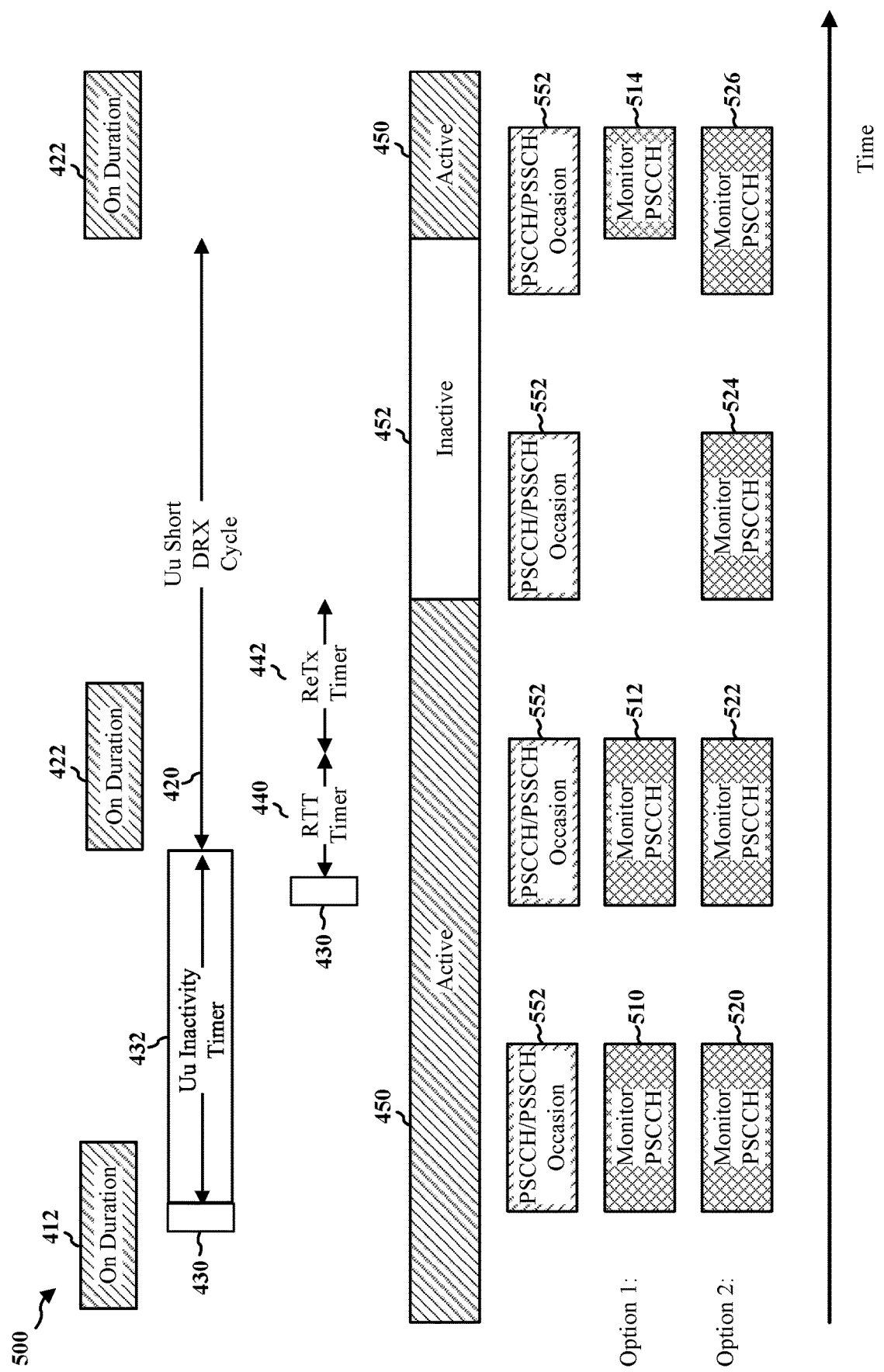
FIG. 5 is a timing diagram of an example of sidelink DRX operation.

FIG. 5 is a timing diagram 500 of an example scenario for monitoring a PSCCH based on a DRX mode for a Uu link with a base station. The DRX mode for the Uu link may be similar to described above with respect to FIG. 4. During an on duration 412 (for either long DRX cycle or short DRX cycle), the UE 104 may receive a grant 430 for a new transmission. The UE 104 may start the inactivity timer 432 in response to the grant 430. When the inactivity timer 432 stops, the UE 104 may enter a short DRX cycle 420 including an on duration 422. During the inactivity timer 432, the UE 104 may receive a second grant 430 for a retransmission. The UE 104 may start the RTT timer 440 in response to the second grant 430 and start the ReTx timer 442 when the RTT timer 440 ends.

In this example, the UE 104 may be in an active state 450 from the first on duration 412 until the end of the ReTx timer 442. Although a portion of the ReTx timer 442 is within the off portion of the short DRX cycle 420, the UE 104 may monitor for the retransmission during the ReTx timer 442, so that portion may be considered active state 450. The UE 104 may be in inactive state 452 for a remaining portion of the short DRX cycle 420 and resume active state 450 during the next on duration 422.

The PSCCH/PSSCH occasions 552 may occur periodically based on the sidelink resource configuration. In a first option, the UE 104 may monitor the PSCCH during the portions of the PSCCH/PSSCH occasions 552 that overlap the active state 450. Accordingly, the UE 104 may monitor the PSCCH during occasions 510 and 512. A PSCCH/PSSCH occasion 552 may partially overlap the active state 450 during monitoring occasion 514 and the UE 104 may monitor the PSCCH during the concurrent portion. In a second option, the UE 104 may monitor the PSCCH during any PSCCH/PSSCH occasion 552. For example, the PSCCH/PSSCH occasions 552 may be considered part of active time, or the UE 104 may determine PSCCH monitoring occasions 520, 522, 524, 526 independently of the Uu DRX mode.

FIG. 6 is a diagram 600 illustrating example communications and components of a base station 102, a first UE 104-*a*, and a second UE 104-*b*. The first UE 104-*a* may include a sidelink Tx component 199 and the second UE 104-*b* may include a sidelink Rx component 140. The first UE 104-*a* may be a sidelink transmitting UE and the second UE 104-*b* may be a sidelink receiving UE. As discussed above regarding FIG. 1, the first UE 104-*a* may include a configuration component 642, a buffer component 644, an activity component 646, and an indication component 648. The UE 104-*a* may also include a receiver component 650 and a transmitter component 652. As discussed above regarding FIG. 1, the second UE 104-*b* may include a configuration component 142, a monitoring component 144, an indication component 146, and an optional re-use component 148. The UE 104-*b* may also include a receiver component 610 and a transmitter component 612. The receiver component 610 may include, for example, a RF receiver for receiving the signals described herein. The transmitter component 612 may include, for example, an RF transmitter for transmitting the signals described herein. In an aspect, the receiver component 610 and the transmitter component 612 may be implemented as a transceiver. The UE 104-*a* may also include a receiver component 650 and a transmitter component 652. In an aspect, a UE may include both the sidelink Tx component 199 and the sidelink Rx component 140.

The base station 102 may include the sidelink configuration component 198. The base station 102 may transmit a SL resource configuration 620 to the first UE 104-a and transmit sidelink resource configuration 622 to the second UE 104-b. For example, the sidelink resource configurations 620, 622 may be RRC messages. The configuration component 642, 142 at each of the first UE 104-a and the second UE 104-b may receive the respective sidelink resource configuration 620, 622 via the PDSCH. The sidelink resource configuration 620 may indicate Tx resources 654 on which the UE 104-a may transmit on the PSCCH 630. The sidelink resource configuration 622 may indicate PSCCH/PSSCH occasions 552 for monitoring the PSCCH 630, as discussed above regarding FIG. 5. The PSCCH/PSSCH occasions 552 for the UE 104-b may correspond to the Tx resources 654 for the UE 104-a.

The buffer component 644 may determine whether the first UE 104-a has data to transmit to the second UE 104-b. For example, the buffer component 644 may include a transmit buffer that stores data packets 662 prior to transmission. The data packets 662 may be generated by, for example, higher layer applications of the UE 104-a. The buffer component 644 may store the data packets 662 until a PSCCH/PSSCH occasion 552 indicated by the TX resources 654.

The activity component 646 of the first UE 104-a may determine a DRX state 672 for the UE 104-a and/or the UE 104-b. The DRX state 672 may be either DRX active state 450 or a DRX inactive state 452 based on the Uu link with the base station 102. For example, the activity component 646 may determine the DRX state 672 based on the Uu RTT timer 440, the Uu ReTx timer 442, and the Uu inactivity timer 432 as discussed above with respect to FIG. 4 and FIG. 5. For the UE 104-b, the activity component 646 may receive an active state duration 670 from the UE 104-b.

The first UE 104-a and the second UE 104-b may communicate via the communication link 158, which may be referred to as a direct link or the sidelink. The transmitter component 652 of the first UE 104-a may transmit the PSCCH 630 using configured Tx resources 654. In an aspect, the activity component 646 may control whether to transmit the PSCCH 630 on the configured Tx resources 654 based on the DRX state 672 (e.g., active 450 or inactive 452). In another aspect, the transmitter component 652 may always be able to transmit on the configured Tx resources 654, which may be considered active time for the sidelink.

At the second UE 104-b, the monitoring component 144 may determine a DRX state 672 based on the DRX mode for the Uu link with the base station 102 (e.g., as described above with respect to FIG. 4 and FIG. 5). Further, the monitoring component 144 may determine an active state duration 670. For example the active state duration 670 may refer to a duration of time when the DRX state 672 is predicted to be active. As discussed above with respect to FIGS. 4 and 5, the active time for the Uu link may be increased when an inactivity timer 432 is reset or decreased when a DRX command 434 is received.

In another aspect, the active time may include the PSCCH/PSSCH occasions 552. The monitoring component 144 may monitor the PSCCH 630 during one or more of the PSCCH/PSSCH occasions 552 that coincide with the active state duration 670. For example, as discussed above, under option 1, the monitoring component 144 may monitor the PSCCH during monitoring occasions 510, 512, and 514.

Under option 2, where the PSCCH/PSSCH occasions are always monitored, the monitoring component 144 may monitor the PSCCH during monitoring occasions 520, 522, 524, and 526. The monitoring component 144 of the second UE 104-b may receive the PSCCH 630 via the receiver component 610. The receiver component 610 may also receive the PSSCH 632 based on the PSCCH 630. The monitoring component 144 of the second UE 104-b may determine whether the PSSCH 632 was correctly received and transmit an ACK/NACK. For example, the second UE 104-b may transmit the ACK/NACK via either the physical sidelink feedback channel (PSFCH) 634 to the first UE 104-a or a PUCCH 636 to the base station 102.

In an aspect, the buffer component 644 may determine that there is no data packet 662 to transmit to the UE 104-b during a PSCCH/PSSCH occasion 552. The UE 104-b may be able to save power or re-use the resources of the PSCCH/PSSCH occasion 552 if the UE 104-b is aware that no PSCCH is to be received from the UE 104-a. The indication component 648 of the UE 104-a may transmit SL DRX command 660 that indicates that the first UE 104-a has no data to send to the second UE 104-b. In an aspect, the indication component 648 may transmit the SL DRX command 660 at the start of a PSCCH/PSSCH occasion 552 when the UE 104-a has no data to transmit. In another aspect, the indication component 648 may transmit the SL DRX command 660 after transmitting one or more data packets 662 on the PSSCH 632 during the PSCCH/PSSCH occasion 552. The indication component 648 may transmit the SL DRX command at either the physical (PHY) layer or the media access control (MAC) layer. For example, the indication component 648 may transmit the SL DRX command 660 on the PSCCH 630 as a sidelink control information (SCI). As another example, the indication component 648 may transmit the SL DRX command 660 as a sidelink MAC control element (CE), which may be transmitted on the PSSCH 632. For example, when the buffer component 644 transmits the data packet 662 on the PSSCH 632, a MAC-CE including the SL DRX command 660 indicating no more data packets to transmit may be included in the same transmission. The indication component 648 may transmit a no data indication 664 to the base station 102 (e.g., on the PUCCH) informing the base station 102 that the UE 104-a has no data to transmit to the UE 104-b during the PSCCH/PSSCH occasion 552.

The indication component 146 of the UE 104-b may receive the SL DRX command 660 via the receiver component 610. The indication component 146 may determine an unused portion 674 of the PSCCH/PSSCH occasion 552. For example, the unused portion 674 may include any portion of the PSCCH/PSSCH occasion 552 after the SL DRX command 660 is received. In an aspect, the indication component 146 may indicate the unused portion 674 to the monitoring component 144, which may not monitor the PSCCH for the unused portion 674 in response to the SL DRX command 660. For example, if the UE 104-b is not in active state for the link with the base station 102 (e.g., for option 2 in FIG. 5), the monitoring component 144 may enter a sleep mode during the unused portion 674. In an aspect, during the sleep mode, the UE 104 may power down the receiver component 610. In some implementations, the UE 104 may power down other receive chain components and/or transmit chain components during the sleep mode. If the UE 104-b is in active state for the link with the base station 102 (e.g., for either option 1 or option 2) the monitoring component 144 may monitor a PDCCH but not the PSCCH during the unused portion 674.

The re-use component 148 may indicate an ability to re-use the unused portion 674. For example, if the UE 104-b is not in active state for the link with the base station 102, the re-use component 148 may attempt to re-use the unused portion 674. For example, if the UE 104-b has data for an uplink transmission, the re-use component 148 may transmit a scheduling request (SR) 676 (e.g., on the RACH) including an indication of unused sidelink resources. The base station 102 may determine the specific sidelink resources based on the configuration of the UE 104-b and schedule the UE 104-b for the uplink transmission using at least a portion of the unused sidelink resources. If the UE 104-b has no uplink traffic, the re-use component 148 may still inform the base station 102 of the unused portion 674. If the base station 102 has no downlink traffic for the UE 104-b the base station 102 may transmit the DRX command 434. In another aspect, if the UE 104-b is in the active state for the link with the base station 102 (and therefore cannot sleep), the re-use component 148 may inform the second UE 104-a of the active state duration 670. For example, the re-use component 148 may transmit the active state duration 670 on the PSFCH 634. Accordingly, if the UE 104-a generates a data packet 662 during the PSCCH/PSSCH occasion 552, the UE 104-a may transmit the data packet 662 via PSCCH 680 and PSSCH 682 without waiting for a next PSCCH/PSSCH occasion 552. In an aspect, the re-use component 148 may be configured with a prohibition time defining a time period after the SL DRX command 660 that cannot be reused.

Figure 7:
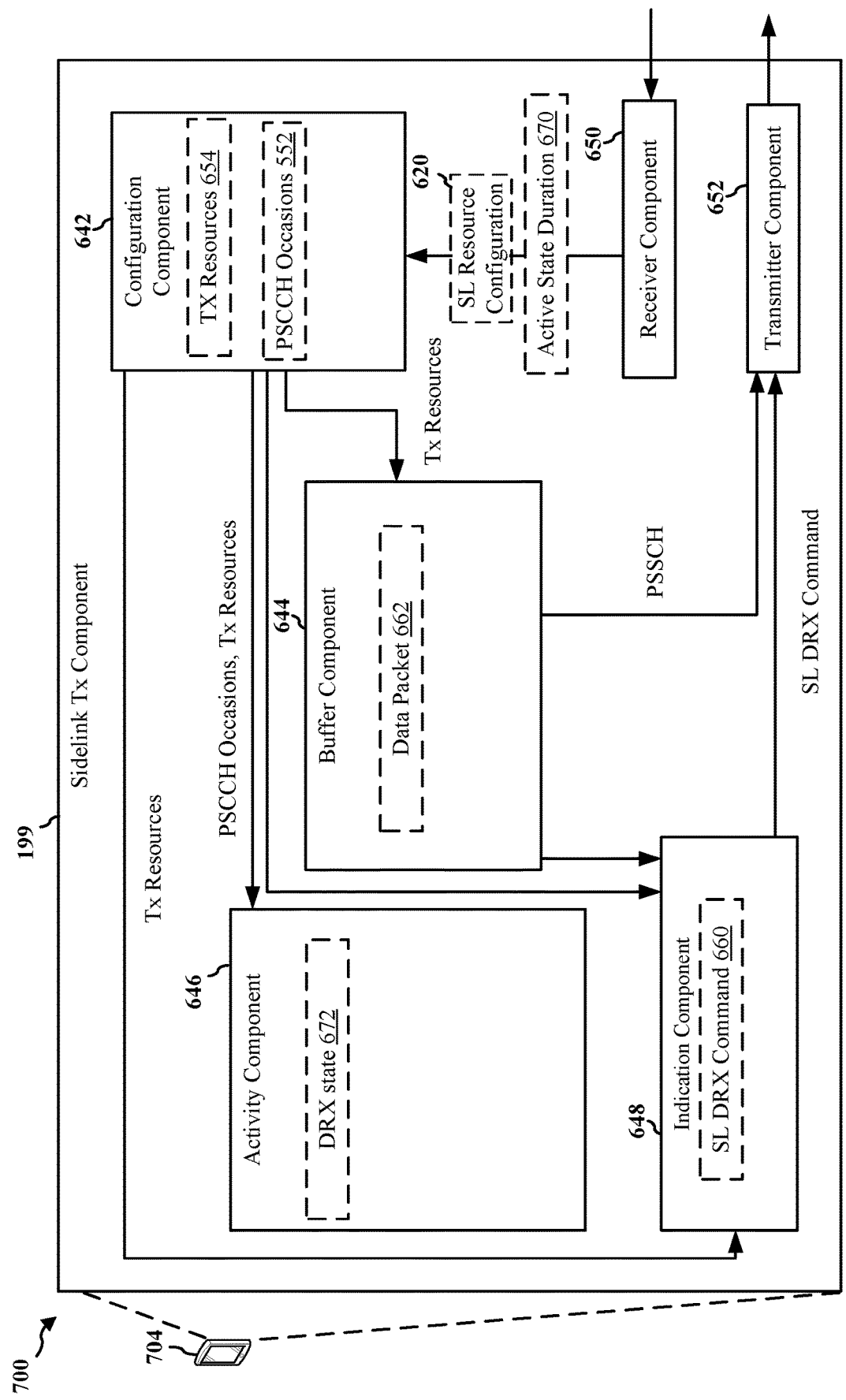
FIG. 7 is a conceptual data flow diagram illustrating the data flow between different means/components in an example receiving UE.

FIG. 7 is a conceptual data flow diagram 700 illustrating the data flow between different means/components in an example UE 704, which may be an example of the UE 104-a including the sidelink Tx component 199.

The receiver component 650 may receive downlink signals such as the SL resource configuration 620, which may be, for example, an RRC configuration message. The receiver component 650 may pass the SL resource configuration 620 to the configuration component 642. In an aspect, the receiver component 650 may receive the active state duration 670 from the UE 104-b. The receiver component 650 may pass the active state duration 670 to the activity component 646.

The configuration component 642 may receive the SL resource configuration 620 from the receiver component 650. The configuration component 642 may decode the SL resource configuration 620 to determine the PSCCH/PSSCH occasions 552 and the TX resource 654. The configuration component 642 may provide the PSCCH/PSSCH occasions 552 to the activity component 646. The configuration component 642 may provide the TX resources 654 to the buffer component 644 and the indication component 648.

The activity component 646 may determine an active time for the UE 104-b and control the buffer component 644 and/or the indication component 648 to transmit while the DRX state 672 for the UE 104-b is in the active state.

The buffer component 644 may receive the Tx resources 654 corresponding to the PSCCH/PSSCH occasions 552 for the UE 104-b from the configuration component 642. The buffer component 644 may determine whether there is data (e.g., data packet 662) to transmit to the UE 104-b during the PSCCH/PSSCH occasions 552. When there is data to transmit, the buffer component 644 may generate a PSSCH for transmission via the transmitter component 652. When there is no data to transmit, the buffer component 644 may trigger the indication component 648.

The indication component 648 may generate the SL DRX command 660 when there is no data to transmit during a PSCCH/PSSCH occasion 552. The indication component 648 may transmit the SL DRX command 660 via the transmitter component 652.

Figure 8:
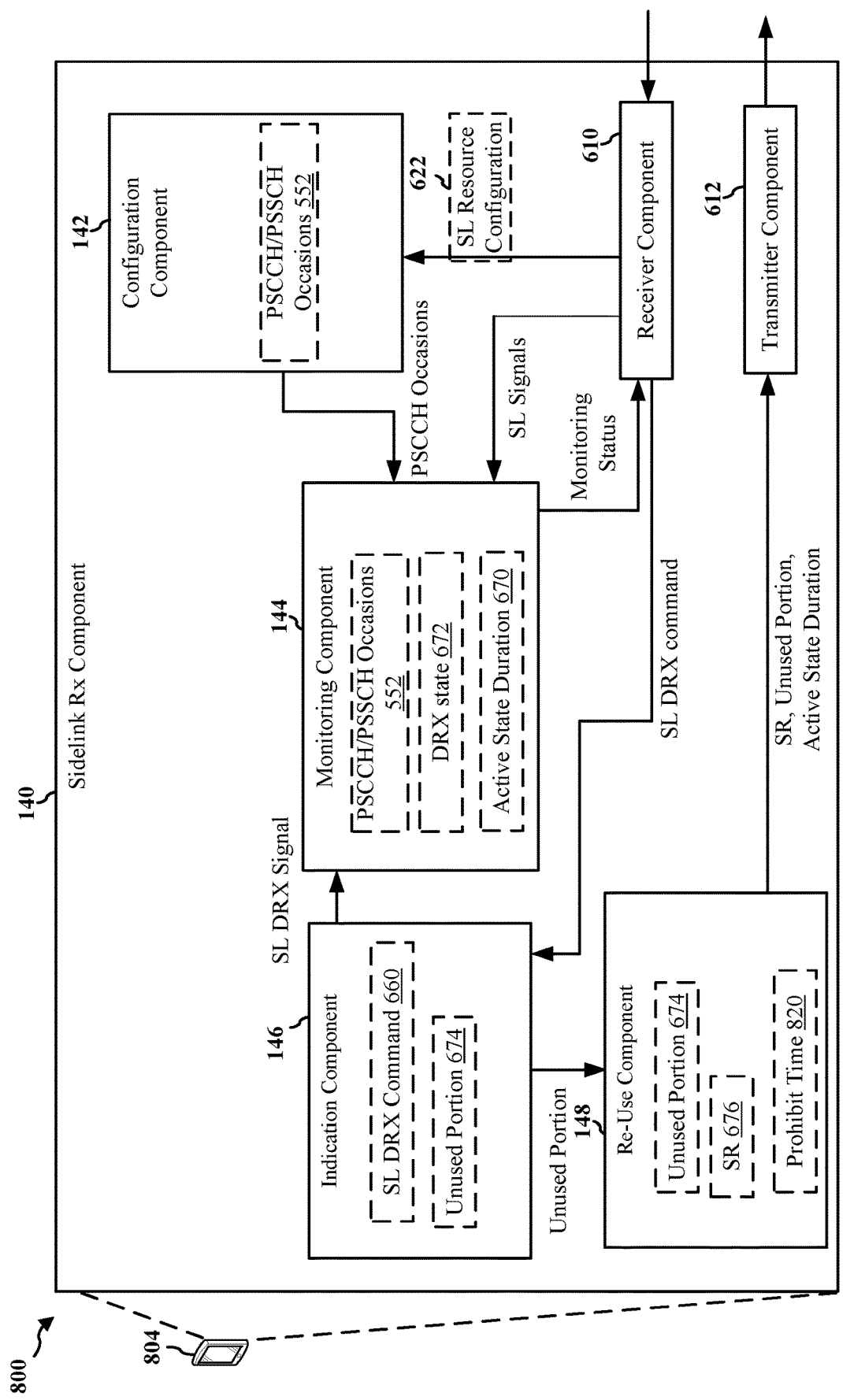
FIG. 8 is a conceptual data flow diagram illustrating the data flow between different means/components in an example transmitting UE.

FIG. 8 is a conceptual data flow diagram 800 illustrating the data flow between different means/components in an example UE 804, which may be an example of the UE 104-b including the sidelink Rx component 140.

The receiver component 610 may receive downlink signals such as the SL resource configuration 622, which may be, for example, an RRC configuration message. The receiver component 610 may pass the SL resource configuration 622 to the configuration component 142. The receiver component 610 may receive sidelink signals such as PSCCH 630 and PSSCH 632. The receiver component 610 may pass the sidelink signals to the monitoring component 144. The receiver component 610 may receive the SL DRX command 660. The receiver component 610 may pass the SL DRX command 660 to the indication component 146.

The configuration component 142 may receive the SL resource configuration 622 from the receiver component 610. The configuration component 142 may decode the SL resource configuration 620 to identify the PSCCH/PSSCH occasions 552. The configuration component 142 may provide the PSCCH/PSSCH occasions 552 to the monitoring component 144.

The monitoring component 144 may determine the DRX state 672 for the UE 804 and control the receiver component 610 and the transmitter component 612 according to the DRX state 672 (e.g., by sending a monitoring status). For example, the monitoring component 144 may determine the DRX state 672 based on the Uu link as described above regarding FIGS. 4 and 5. Similarly, the monitoring component 144 may determine the active state duration 670 based on the Uu link. The monitoring component 144 may receive the PSCCH/PSSCH occasions 552 from the configuration component. The monitoring component 144 may determine whether to monitor the SL signals such as the PSCCH based on the PSCCH/PSSCH occasions 552, the DRX state 672, and any sidelink DRX command 660. In particular, the monitoring component 144 may monitor the PSCCH 630 during one or more of the PSCCH/PSSCH occasions 552 that coincide with the active state 450 until a sidelink DRX command 660 is received. The monitoring component 144 may provide a monitoring status to the receiver component 610 that indicates whether the receiver component 610 is to provide the SL signals or enter a sleep mode.

The indication component 146 may receive the SL DRX command 660 from the receiver component 610. The indication component 146 may determine the unused portion 674 based on the PSCCH/PSSCH occasions 552. The indication component 146 may provide a SL DRX signal to the monitoring component 144 indicating that the monitoring component 144 does not monitor the PSCCH 630 during the unused portion 674. The indication component 146 may provide the unused portion 674 to the re-use component 148.

The re-use component 148 may receive the unused portion 674 from the indication component 146. The re-use component 148 may determine whether the unused portion 674 may be re-used based on the DRX state 672. For example, if the UE 804 is in inactive time and has uplink traffic, the re-use component 148 may transmit the SR 676 via the transmitter component 612 informing the base station 102 of the unused portion 674. As another example, if the UE 804 is in inactive time and has no uplink traffic, the re-use component 148 may inform the base station 102 of the unused portion 674 via the transmitter component 612 for use in a downlink transmission. If the UE 804 is in active time, the re-use component 148 may provide the active state duration 670 to UE 104-*a* in case the UE 104-*a* has data to transmit during the active state duration 670. The re-use component 148 may measure a prohibit time 820 before sending the active state duration 670.

Figure 9:
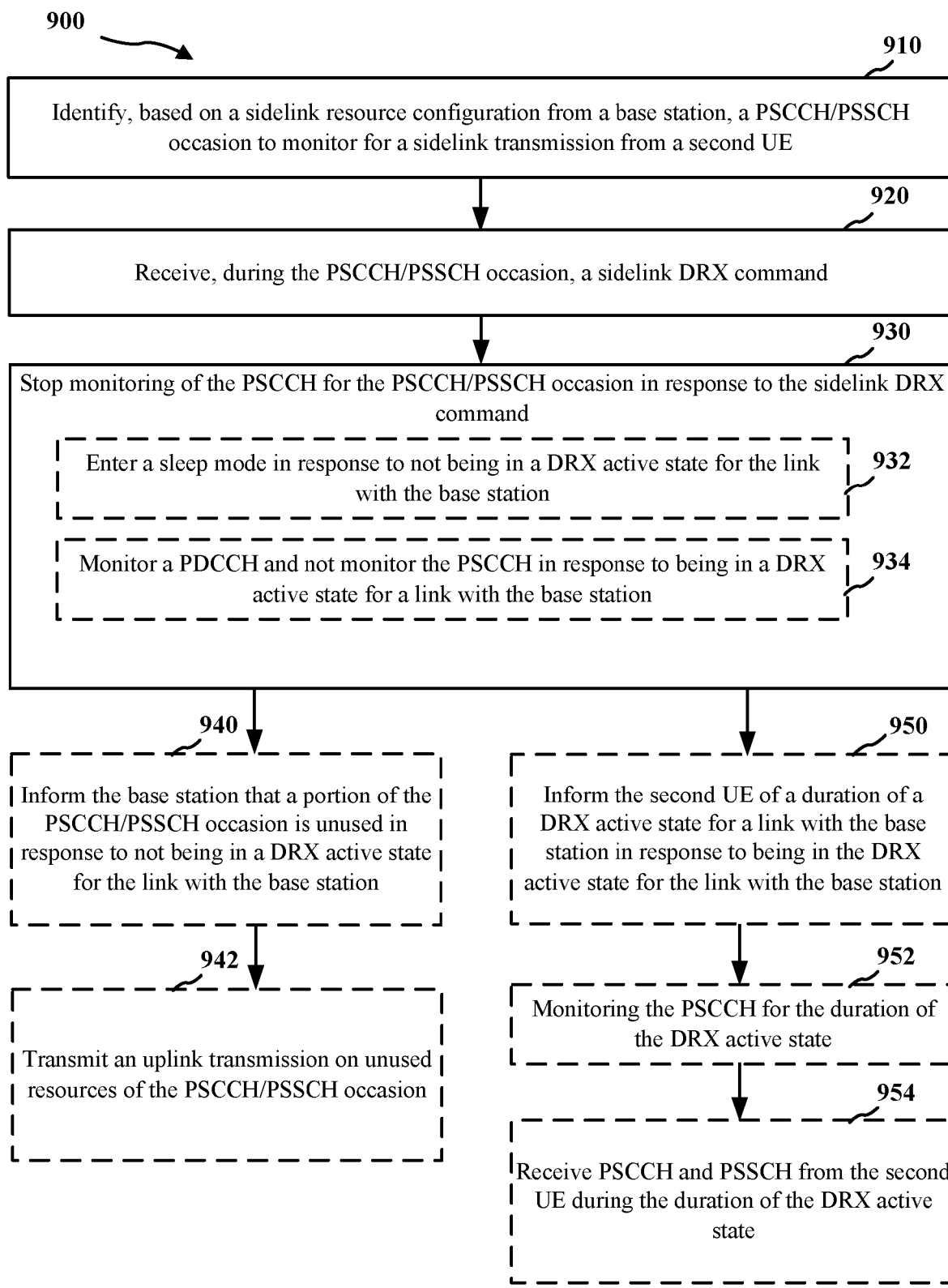
FIG. 9 is a flowchart of an example of a method of receiving a sidelink transmission in a DRX mode.

FIG. 9 is a flowchart of an example method 900 for operating a UE 104 for sidelink DRX using mode 2 scheduling and a sidelink DRX command. The method 900 may be performed by a UE (such as the UE 104, which may include the memory 360 and which may be the entire UE 104 or a component of the UE 104 such as the sidelink Rx component 140, TX processor 368, the RX processor 356, or the controller/processor 359). The method 900 may be performed by the sidelink Rx component 140 in communication with the sidelink configuration component 198 of the base station 102 and the sidelink Tx component 199 of another UE 104.

At block 910, the method 900 may include identifying, based on a sidelink resource configuration from a base station, a PSCCH/PSSCH occasion to monitor for a sidelink transmission from a second UE. In an aspect, for example, the UE 104, the TX processor 368 and/or the controller/processor 359 may execute the sidelink Rx component 140 and/or the configuration component 142 to identify, based on a sidelink resource configuration 622 from a base station, a PSCCH/PSSCH occasion 552 to monitor for a sidelink transmission from a second UE 104-*a*. The PSCCH/PSSCH occasion 552 may be one of a set of configured PSCCH/PSSCH occasions 552. Accordingly, the UE 104, the RX processor 356, and/or the controller/processor 359 executing the sidelink Rx component 140 and/or the configuration component 142 may provide means for identifying, based on a sidelink resource configuration from a base station, a PSCCH/PSSCH occasion to monitor for a sidelink transmission from a second UE.

At block 920, the method 900 may include receiving, during the PSCCH/PSSCH occasion, a signal indicative of a sidelink DRX command. In an aspect, for example, the UE 104, the RX processor 356 and/or the controller/processor 359 may execute the sidelink Rx component 140 and/or the indication component 146 to receive, during the PSCCH/PSSCH occasion, a signal indicative of a sidelink DRX command 660. Accordingly, the UE 104, the RX processor 356, the Tx processor 368, and/or the controller/processor 359 executing the sidelink Rx component 140 and/or the indication component 146 may provide means for receiving, during the PSCCH/PSSCH occasion, a signal indicative of a sidelink DRX command.

At block 930, the method 900 may include stopping monitoring of the PSCCH for the PSCCH/PSSCH occasion in response to the DRX command. In an aspect, for example, the UE 104, the RX processor 356 and/or the controller/processor 359 may execute the sidelink Rx component 140 and/or the monitoring component 144 to stop monitoring of the PSCCH 630 for the PSCCH/PSSCH occasion 552 in response to the sidelink DRX command. In an aspect, at sub-block 932, the block 930 may include entering a sleep mode in response to not being in a DRX active state for the link with the base station 102.

In an aspect, at sub-block 934, the block 930 may include monitoring a PDCCH and not monitoring the PSCCH in response to being in a DRX active state for a link with the base station 102. Accordingly, the UE 104, the RX processor 356, and/or the controller/processor 359 executing the sidelink Rx component 140 and/or the monitoring component 144 may provide means for stopping monitoring of the PSCCH for the PSCCH/PSSCH occasion in response to the DRX command.

At block 940, the method 900 may optionally include informing the base station that a portion of the PSCCH/PSSCH occasion is unused in response to not being in a DRX active state for the link with the base station. In an aspect, for example, the UE 104, the RX processor 356 and/or the controller/processor 359 may execute the sidelink Rx component 140 and/or the re-use component 148 to inform the base station 102 that a portion of the PSCCH/PSSCH occasion is unused in response to not being in a DRX active state for the link with the base station 102. For example, informing the base station may include transmitting a scheduling request (e.g., SR 676) informing the base station 102 that the portion of the PSCCH/PSSCH occasion is unused when the first UE has uplink data to transmit to the base station. Accordingly, the UE 104, the TX processor 368, and/or the controller/processor 359 executing the sidelink Rx component 140 and/or the re-use component 148 may provide means for informing the base station that a portion of the PSCCH/PSSCH occasion is unused in response to not being in a DRX active state for the link with the base station.

At block 942, the method 900 may optionally include transmitting an uplink transmission on unused resources of the PSCCH/PSSCH occasion. For example, the transmitter component 612 may transmit the uplink transmission on unused resources indicated by an uplink grant. In another aspect, the method 900 may optionally include receiving a DRX command from the base station and sleeping in response to the DRX command (e.g., if there is no uplink or downlink data to transmit).

At block 950, the method 900 may optionally include informing the second UE of a duration of a DRX active state for a link with the base station in response to being in the DRX active state for the link with the base station. In an aspect, for example, the UE 104, the RX processor 356, and/or the controller/processor 359 may execute the sidelink Rx component 140 and/or the re-use component 148 to inform the second UE of a duration of a DRX active state for a link with the base station in response to being in the DRX active state for the link with the base station. In an aspect, the re-use component 148 may inform the second UE of the remaining duration of the DRX active state after a prohibit time 820 measured from the sidelink DRX command. Accordingly, the UE 104, the RX processor 356, and/or the controller/processor 359 executing the sidelink Rx component 140 and/or the re-use component 148 may provide means for informing the second UE of a duration of a DRX active state for a link with the base station in response to being in the DRX active state for the link with the base station.

Figure 10:
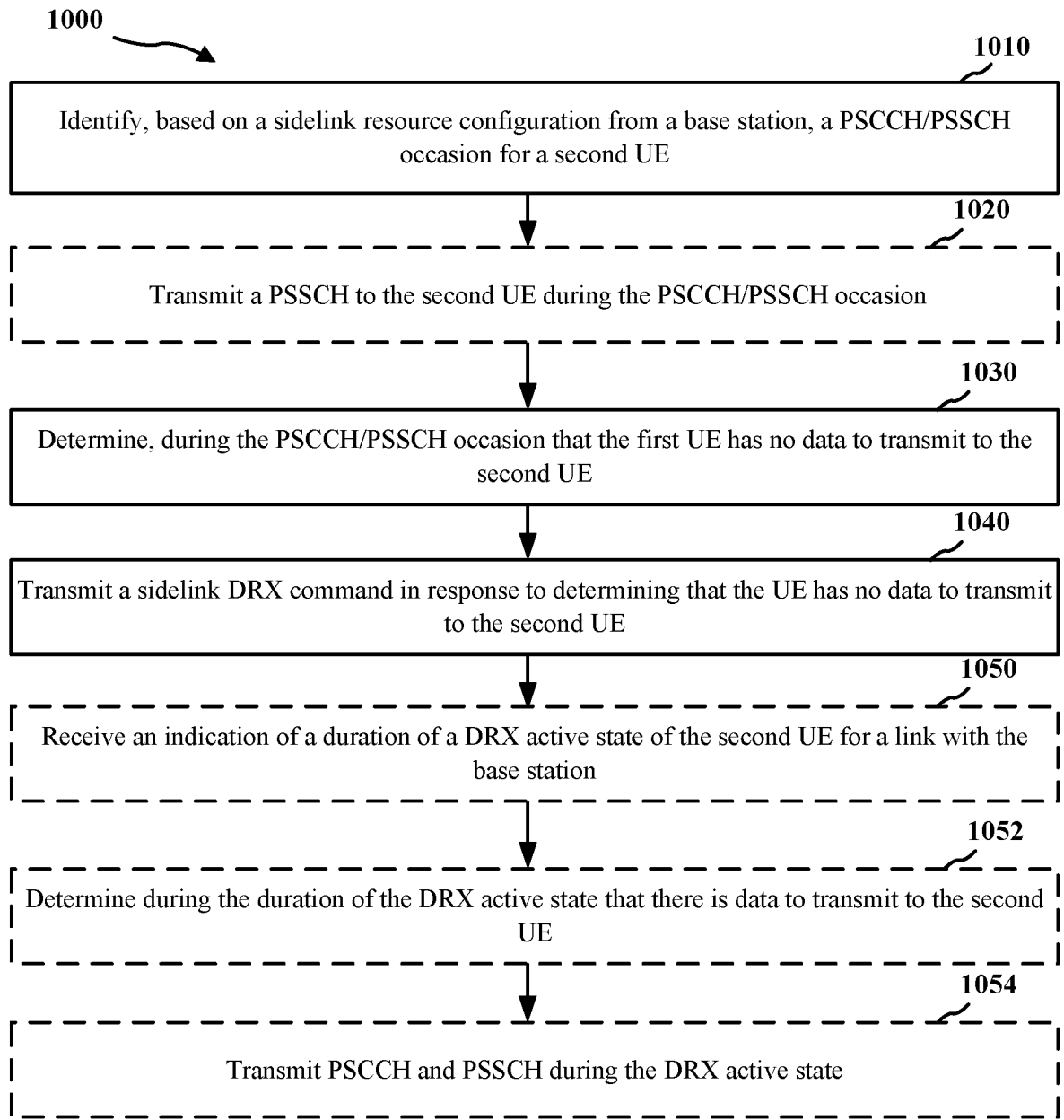
FIG. 10 is a flowchart of an example of a method of transmitting a sidelink transmission in a DRX mode.

At block 952, in response to informing the second UE, the method 900 may optionally include monitoring the PSCCH for the duration of the DRX active state. For instance, the monitoring component 144 may monitor the PSCCH 630. At block 954, the method 900 may optionally include receiving the PSCCH and the PSSCH from the second UE during the duration of the DRX active state FIG. 10 is a flowchart of an example method 1000 for operating a UE 104 for transmitting with sidelink DRX using mode 2 scheduling and a sidelink DRX command. The method 1000 may be performed by a UE (such as the UE 104, which may include the memory 360 and which may be the entire UE 104 or a component of the UE 104 such as the sidelink Tx component 199, TX processor 368, the RX processor 356, or the controller/processor 359). The method 1000 may be performed by the sidelink Tx component 199 in communication with the sidelink configuration component 198 of the base station 102 and the sidelink Rx component 140 of another UE 104-*b*.

In block 1010, the method 1000 may include identifying, based on a sidelink resource configuration from a base station, a PSCCH/PSSCH occasion for a second UE. In an aspect, for example, the UE 104, the RX processor 356, and/or the controller/processor 359 may execute the sidelink Tx component 199 and/or the configuration component 642 to identify, based on a sidelink resource configuration 620 from a base station 102, a PSCCH/PSSCH occasion 552 for a second UE. The PSCCH/PSSCH occasion 552 may be one of a plurality of configured PSCCH/PSSCH occasions. Accordingly, the UE 104, the RX processor 356, and/or the controller/processor 359 executing the sidelink Tx component 199 and/or the configuration component 642 may provide means for identifying, based on a sidelink resource configuration from a base station, a PSCCH/PSSCH occasion for a second UE.

In block 1020, the method 1000 may optionally include transmitting a PSSCH to the second UE during the PSCCH/PSSCH occasion. In an aspect, for example, the UE 104, the TX processor 368, and/or the controller/processor 359 may execute the sidelink Tx component 199 and/or the buffer component 644 to transmit a PSSCH 632 to the second UE 104-*b* during the PSCCH/PSSCH occasion 552. Accordingly, the UE 104, the TX processor 368, and/or the controller/processor 359 executing the sidelink Tx component 199 and/or the buffer component 644 may provide means for transmitting a PSSCH to the second UE during the PSCCH/PSSCH occasion.

In block 1030, the method 1000 may include determining, during the PSCCH/PSSCH occasion that the first UE has no data to transmit to the second UE. In an aspect, for example, the UE 104, the TX processor 368, and/or the controller/processor 359 may execute the sidelink Tx component 199 and/or the buffer component 644 to determine, during the PSCCH/PSSCH occasion 552 that the first UE 104-*a* has no data to transmit to the second UE 104-*b*. When the block 1020 is performed, the determination in block 1030 may be in response to transmitting the PSSCH in block 1020. That is, the determination may occur in the middle of the PSCCH/PSSCH occasion 552 after the PSSCH 632 has been transmitted. Accordingly, the UE 104, the RX processor 356, and/or the controller/processor 359 executing the sidelink Tx component 199 and/or the buffer component 644 may provide means for determining, during the PSCCH/PSSCH occasion that the first UE has no data to transmit to the second UE.

In block 1040, the method 1000 may include transmitting a sidelink DRX command in response to determining that the UE has no data to transmit to the second UE. In an aspect, for example, the UE 104, the TX processor 368, and/or the controller/processor 359 may execute the sidelink Tx component 199 and/or the indication component 648 to transmit a sidelink DRX command 660 in response to determining that the UE has no data to transmit to the second UE. For example, the sidelink DRX command 660 may be transmitted as a SCI or a sidelink MAC-CE. The indication component 648 may also transmit a no data indication 664 to the base station. Accordingly, the UE 104, the TX processor 368, and/or the controller/processor 359 executing the sidelink Tx component 199 and/or the indication component 648 may provide means for transmitting a sidelink DRX command in response to determining that the UE has no data to transmit to the second UE.

In block 1050, the method 1000 may optionally include receiving an indication of a duration of a DRX active state of the second UE for a link with the base station. In an aspect, for example, the UE 104, the RX processor 356, and/or the controller/processor 359 may execute the sidelink Tx component 199 and/or the activity component 646 to receive the active state duration 670 from the second UE for a link with the base station 102. Accordingly, the UE 104, the RX processor 356, and/or the controller/processor 359 executing the sidelink Tx component 199 and/or the configuration component 642 may provide means for receiving an indication of a duration of a DRX active state of the second UE for a link with the base station.

At block 1052, the method 1000 may optionally include determining, during the duration of the DRX active state, that there is data to transmit to the second UE. For example, the buffer component 644 may determine that there is a data packet 662 to transmit to the second UE. At block 1054, the method 1000 may optionally include transmitting the PSCCH 680 and the PSSCH 682 during the DRX active state.

SOME FURTHER EXAMPLE CLAUSES

Implementation examples are described in the following numbered clauses:

1. A method of wireless communications, comprising, at a first user equipment:

identifying, based on a sidelink resource configuration from a base station, a physical sidelink control/shared channel (PSCCH/PSSCH) occasion to monitor for a sidelink transmission from a second UE;

receiving, during the PSCCH/PSSCH occasion, a sidelink discontinuous reception (DRX) command; and stopping monitoring of the PSCCH for the PSCCH/PSSCH occasion in response to the sidelink DRX command.

2. The method of clause 1, wherein stopping monitoring of the PSCCH comprises entering a sleep mode in response to not being in a DRX active state for a link with the base station.

3. The method of clause 1 or 2, further comprising informing the base station that a portion of the PSCCH/PSSCH occasion is unused in response to not being in a DRX active state for a link with the base station.

4. The method of clause 3, wherein informing the base station that the portion of the PSCCH/PSSCH occasion is unused comprises transmitting a scheduling request informing the base station that the portion of the PSCCH/PSSCH occasion is unused when the first UE has uplink data to transmit to the base station, the method further comprising transmitting an uplink transmission on unused resources of the PSCCH/PSSCH occasion.

5. The method of clause 3, further comprising:

receiving a DRX command from the base station; and entering a sleep mode in response to the DRX command.

6. The method of clause 1, wherein stopping monitoring of the PSCCH comprises monitoring a physical downlink control channel (PDCCH) and not monitoring the PSCCH in response to being in a DRX active state for a link with the base station.

7. The method of clause 1 or 6, further comprising:
informing the second UE of a duration of a DRX active state for a link with the base station in response to being in the DRX active state for the link with the base station; and
monitoring the PSCCH for the duration of the DRX active state.

8. The method of clause 7, wherein informing the second UE of the duration of the DRX active state comprises informing the second UE of a remaining duration of the DRX active state after a prohibition time measured from the sidelink DRX command.

9. The method of clause 7, further comprising receiving PSCCH and PSSCH from the second UE during the duration of the DRX active state.

10. The method of any of clauses 1-9, wherein the sidelink DRX command is a sidelink control information (SCI).

11. The method of any of clauses 1-9, wherein the sidelink DRX command is a sidelink media access control (MAC) control element (CE).

12. An apparatus for wireless communication for a first user equipment (UE), comprising:
a memory storing computer-executable instructions; and
at least one processor coupled to the memory and configured to execute the computer-executable instructions to:
identify, based on a sidelink resource configuration from a base station, a physical sidelink control/shared channel (PSCCH/PSSCH) occasion to monitor for a sidelink transmission from a second UE;
receive, during the PSCCH/PSSCH occasion, a sidelink discontinuous reception (DRX) command; and
stop monitoring of the PSCCH for the PSCCH/PSSCH occasion in response to the sidelink DRX command.

13. The apparatus of clause 12, wherein the at least one processor is configured to enter a sleep mode in response to not being in a DRX active state for a link with the base station.

14. The apparatus of clause 12 or 13, wherein the at least one processor is configured to inform the base station that a portion of the PSCCH/PSSCH occasion is unused in response to not being in a DRX active state for a link with the base station.

15. The apparatus of clause 14, wherein the at least one processor is configured to:
transmit a scheduling request informing the base station that the portion of the PSCCH/PSSCH occasion is unused when the first UE has uplink data to transmit to the base station; and
transmit an uplink transmission on unused resources of the PSCCH/PSSCH occasion.

16. The apparatus of clause 14, wherein the at least one processor is configured to:
receive a DRX command from the base station; and
enter a sleep mode in response to the DRX command.

17. The apparatus of clause 12, wherein the at least one processor is configured to monitor a physical downlink control channel (PDCCH) and not monitor the PSCCH in response to being in a DRX active state for a link with the base station.

18. The apparatus of clause 12 or 17, wherein the at least one processor is configured to:
inform the second UE of a duration of a DRX active state for a link with the base station in response to being in the DRX active state for the link with the base station; and
monitor the PSCCH for the duration of the DRX active state.

19. The apparatus of clause 18, wherein the at least one processor is configured to inform the second UE of a remaining duration of the DRX active state after a prohibition time measured from the sidelink DRX command.

20. The apparatus of clause 18, wherein the at least one processor is configured to receive PSCCH and PSSCH from the second UE during the duration of the DRX active state.

21. The apparatus of any of clauses 12-20, wherein the sidelink DRX command is a sidelink control information (SCI).

22. The apparatus of any of clauses 12-20, wherein the sidelink DRX command is a sidelink media access control (MAC) control element (CE).

23. An apparatus for wireless communications at a first user equipment, comprising:
means for identifying, based on a sidelink resource configuration from a base station, a physical sidelink control/shared channel (PSCCH/PSSCH) occasion to monitor for a sidelink transmission from a second UE;
means for receiving, during the PSCCH/PSSCH occasion, a sidelink discontinuous reception (DRX) command; and
means for stopping monitoring of the PSCCH for the PSCCH/PSSCH occasion in response to the sidelink DRX command.

24. The apparatus of clause 23, wherein the means for stopping monitoring of the PSCCH is configured to enter a sleep mode in response to not being in a DRX active state for a link with the base station.

25. The apparatus of clause 23 or 24, further comprising means for informing the base station that a portion of the PSCCH/PSSCH occasion is unused in response to not being in a DRX active state for a link with the base station.

26. The apparatus of clause 25, wherein the means for informing the base station that the portion of the PSCCH/PSSCH occasion is unused is configured to transmit a scheduling request informing the base station that the portion of the PSCCH/PSSCH occasion is unused when the first UE has uplink data to transmit to the base station, the apparatus further comprising means for transmitting an uplink transmission on unused resources of the PSCCH/PSSCH occasion.

27. The apparatus of clause 25, further comprising:
means for receiving a DRX command from the base station; and
means for entering a sleep mode in response to the DRX command.

28. The apparatus of clause 23, wherein the means for stopping monitoring of the PSCCH is configured to monitor a physical downlink control channel (PDCCH) and not monitoring the PSCCH in response to being in a DRX active state for a link with the base station.

29. The apparatus of clause 23 or 28, further comprising:
means for informing the second UE of a duration of a DRX active state for a link with the base station in response to being in the DRX active state for the link with the base station; and
means for monitoring the PSCCH for the duration of the DRX active state.

30. The apparatus of clause 29, wherein the means for informing the second UE of the duration of the DRX active state is configured to inform the second UE of a remaining duration of the DRX active state after a prohibition time measured from the sidelink DRX command.

31. The apparatus of clause 29, further comprising means for receiving PSCCH and PSSCH from the second UE during the duration of the DRX active state.

32. The apparatus of any of clauses 23-31, wherein the sidelink DRX command is a sidelink control information (SCI).

33. The apparatus of any of clauses 23-31, wherein the sidelink DRX command is a sidelink media access control (MAC) control element (CE).

34. A non-transitory computer-readable medium storing computer executable code, the code when executed by a processor of a first user equipment (UE) causes the processor to:
identify, based on a sidelink resource configuration from a base station, a physical sidelink control/shared channel (PSCCH/PSSCH) occasion to monitor for a sidelink transmission from a second UE;
receive, during the PSCCH/PSSCH occasion, a sidelink discontinuous reception (DRX) command; and
stop monitoring of the PSCCH for the PSCCH/PSSCH occasion in response to the sidelink DRX command.

35. The non-transitory computer-readable medium of clause 34, wherein the code to stop monitoring of the PSCCH comprises code to enter a sleep mode in response to not being in a DRX active state for a link with the base station.

36. The non-transitory computer-readable medium of clause 34 or 35, further comprising code to inform the base station that a portion of the PSCCH/PSSCH occasion is unused in response to not being in a DRX active state for a link with the base station.

37. The non-transitory computer-readable medium of clause 36, wherein the code to inform the base station that the portion of the PSCCH/PSSCH occasion is unused comprises code to transmit a scheduling request informing the base station that the portion of the PSCCH/PSSCH occasion is unused when the first UE has uplink data to transmit to the base station, the non-transitory computer-readable medium further comprising code to transmit an uplink transmission on unused resources of the PSCCH/PSSCH occasion.

38. The non-transitory computer-readable medium of clause 36, further comprising code to:
receive a DRX command from the base station; and
enter a sleep mode in response to the DRX command.

39. The non-transitory computer-readable medium of clause 34, wherein the code to stop monitoring of the PSCCH comprises code to monitor a physical downlink control channel (PDCCH) and not monitor the PSCCH in response to being in a DRX active state for a link with the base station.

40. The non-transitory computer-readable medium of clause 34 or 39, further comprising code to:
inform the second UE of a duration of a DRX active state for a link with the base station in response to being in the DRX active state for the link with the base station; and monitor the PSCCH for the duration of the DRX active state.

41. The non-transitory computer-readable medium of clause 40, wherein the code to inform the second UE of the duration of the DRX active state comprises code to inform the second UE of a remaining duration of the DRX active state after a prohibition time measured from the sidelink DRX command.

42. The non-transitory computer-readable medium of clause 40, further comprising code to receive PSCCH and PSSCH from the second UE during the duration of the DRX active state.

43. The non-transitory computer-readable medium of any of clauses 34-42, wherein the sidelink DRX command is a sidelink control information (SCI).

44. The non-transitory computer-readable medium of any of clauses 34-42, wherein the sidelink DRX command is a sidelink media access control (MAC) control element (CE).

45. A method of wireless communications for a first UE, comprising:
identifying, based on a sidelink resource configuration from a base station, a physical sidelink control/shared channel (PSCCH/PSSCH) occasion for a second UE;
determining, during the PSCCH/PSSCH occasion that the first UE has no data to transmit to the second UE; and
transmitting a sidelink discontinuous reception (DRX) command in response to determining that the UE has no data to transmit to the second UE.

46. The method of clause 45, wherein transmitting the sidelink DRX command comprises transmitting sidelink control information (SCI).

47. The method of clause 45, wherein transmitting the sidelink DRX command comprises transmitting a sidelink media access control (MAC) control element (CE).

48. The method of any of clauses 45-47, further comprising transmitting a PSSCH to the second UE during the PSCCH/PSSCH occasion, wherein determining that the first UE has no data to transmit to the second UE comprises determining that the first UE has no data to transmit to the second UE after the PSSCH.

49. The method of clause 48, wherein transmitting the sidelink DRX command comprises transmitting the sidelink DRX command in an SCI scheduling the PSSCH or in the PSSCH.

50. The method of any of clauses 45-49, further comprising transmitting an indication to the base station that the first UE has no data to transmit to the second UE.

51. The method of any of clauses 45-50, further comprising:
receiving an indication of a duration of a DRX active state of the second UE for a link with the base station;
determining during the duration of the DRX active state that there is data to transmit to the second UE; and
transmitting PSCCH and PSSCH during the DRX active state.

52. An apparatus for wireless communication for a first user equipment (UE), comprising:
a memory storing computer-executable instructions; and
at least one processor coupled to the memory and configured to execute the computer-executable instructions to:
identify, based on a sidelink resource configuration from a base station, a physical sidelink control/shared channel (PSCCH/PSSCH) occasion for a second UE;
determine, during the PSCCH/PSSCH occasion that the first UE has no data to transmit to the second UE; and
transmit a sidelink discontinuous reception (DRX) command in response to determining that the UE has no data to transmit to the second UE.

53. The apparatus of clause 52, wherein the at least one processor is configured to transmit the sidelink DRX command as sidelink control information (SCI).

54. The apparatus of clause 52, wherein the at least one processor is configured to transmit the sidelink DRX command as a sidelink media access control (MAC) control element (CE).

55. The apparatus of any of clauses 52-54, wherein the at least one processor is configured to transmit a PSSCH to the second UE during the PSCCH/PSSCH occasion, wherein determining that the first UE has no data to transmit to the second UE comprises determining that the first UE has no data to transmit to the second UE after the PSSCH.

56. The apparatus of clause 55, wherein the at least one processor is configured to transmit the sidelink DRX command in an SCI scheduling the PSSCH or in the PSSCH.

57. The apparatus of any of clauses 52-56, wherein the at least one processor is configured to transmit an indication to the base station that the first UE has no data to transmit to the second UE.

58. The apparatus of any of clauses 52-57, wherein the at least one processor is configured to:
  receive an indication of a duration of a DRX active state of the second UE for a link with the base station;
  determine during the duration of the DRX active state that there is data to transmit to the second UE; and
  transmit PSCCH and PSSCH during the DRX active state.

59. An apparatus for wireless communication for a first user equipment (UE), comprising:
  means for identifying, based on a sidelink resource configuration from a base station, a physical sidelink control/shared channel (PSCCH/PSSCH) occasion for a second UE;
  means for determining, during the PSCCH/PSSCH occasion that the first UE has no data to transmit to the second UE; and
  means for transmitting a sidelink discontinuous reception (DRX) command in response to determining that the UE has no data to transmit to the second UE.

60. The apparatus of clause 59, wherein the means for transmitting the sidelink DRX command is configured to transmit sidelink control information (SCI).

61. The apparatus of clause 59, wherein the means for transmitting the sidelink DRX command is configured to transmit a sidelink media access control (MAC) control element (CE).

62. The apparatus of any of clauses 59-61, further comprising means for transmitting a PSSCH to the second UE during the PSCCH/PSSCH occasion, wherein the means for determining that the first UE has no data to transmit to the second UE is configured to determine that the first UE has no data to transmit to the second UE after the PSSCH.

63. The apparatus of clause 62, wherein the means for transmitting the sidelink DRX command is configured to transmit the sidelink DRX command in an SCI scheduling the PSSCH or in the PSSCH.

64. The apparatus of any of clauses 59-63, further comprising transmitting an indication to the base station that the first UE has no data to transmit to the second UE.

65. The apparatus of any of clauses 59-64, further comprising:
  receiving an indication of a duration of a DRX active state of the second UE for a link with the base station;
  determining during the duration of the DRX active state that there is data to transmit to the second UE; and
  transmitting PSCCH and PSSCH during the DRX active state.

66. A non-transitory computer-readable medium storing computer executable code, the code when executed by a processor of a first user equipment (UE) causes the processor to:
  identify, based on a sidelink resource configuration from a base station, a physical sidelink control/shared channel (PSCCH/PSSCH) occasion for a second UE;
  determine, during the PSCCH/PSSCH occasion that the first UE has no data to transmit to the second UE; and
  transmit a sidelink discontinuous reception (DRX) command in response to determining that the UE has no data to transmit to the second UE.

67. The non-transitory computer-readable medium of clause 66, wherein the code to transmit the sidelink DRX command comprises code to transmit a sidelink control information (SCI).

68. The non-transitory computer-readable medium of clause 66, wherein the code to transmit the sidelink DRX command comprises code to transmit a sidelink media access control (MAC) control element (CE).

69. The non-transitory computer-readable medium of any of clauses 66-68, further comprising code to transmit a PSSCH to the second UE during the PSCCH/PSSCH occasion, wherein the code to determine that the first UE has no data to transmit to the second UE comprises code to determine that the first UE has no data to transmit to the second UE after the PSSCH.

70. The non-transitory computer-readable medium of clause 69, wherein the code to transmit the sidelink DRX command comprises code to transmit the sidelink DRX command in an SCI scheduling the PSSCH or in the PSSCH.

71. The non-transitory computer-readable medium of any of clauses 66-70, further comprising code to transmit an indication to the base station that the first UE has no data to transmit to the second UE.

72. The non-transitory computer-readable medium of any of clauses 66-70, further comprising code to:
  receive an indication of a duration of a DRX active state of the second UE for a link with the base station;
  determine during the duration of the DRX active state that there is data to transmit to the second UE; and
  transmit PSCCH and PSSCH during the DRX active state.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communications, comprising, at a first user equipment (UE):
identifying, based on a sidelink resource configuration from a base station, a physical sidelink control/shared channel (PSCCH/PSSCH) occasion to monitor for a sidelink transmission from a second UE;
receiving, during the PSCCH/PSSCH occasion, a sidelink discontinuous reception (DRX) command; and
stopping monitoring of the PSCCH for the PSCCH/PSSCH occasion in response to the sidelink DRX command, wherein stopping monitoring of the PSCCH comprises monitoring a physical downlink control channel (PDCCH) and not monitoring the PSCCH in response to being in a DRX active state for a link with the base station.

2. The method of claim 1, wherein stopping monitoring of the PSCCH comprises entering a sleep mode in response to not being in a DRX active state for a link with the base station.

3. The method of claim 1, wherein the sidelink DRX command is a sidelink control information (SCI).

4. The method of claim 1, wherein the sidelink DRX command is a sidelink media access control (MAC) control element (CE).

5. A method of wireless communications, comprising, at a first user equipment (UE):
identifying, based on a sidelink resource configuration from a base station, a physical sidelink control/shared channel (PSCCH/PSSCH) occasion to monitor for a sidelink transmission from a second UE;
receiving, during the PSCCH/PSSCH occasion, a sidelink discontinuous reception (DRX) command;
stopping monitoring of the PSCCH for the PSCCH/PSSCH occasion in response to the sidelink DRX command; and
informing the base station that a portion of the PSCCH/PSSCH occasion is unused in response to not being in a DRX active state for a link with the base station.

6. The method of claim 5, wherein informing the base station that the portion of the PSCCH/PSSCH occasion is unused comprises transmitting a scheduling request informing the base station that the portion of the PSCCH/PSSCH occasion is unused when the first UE has uplink data to transmit to the base station, the method further comprising transmitting an uplink transmission on unused resources of the PSCCH/PSSCH occasion.

7. The method of claim 5, further comprising:
receiving a DRX command from the base station; and
entering a sleep mode in response to the DRX command.

8. A method of wireless communications, comprising, at a first user equipment (UE):
identifying, based on a sidelink resource configuration from a base station, a physical sidelink control/shared channel (PSCCH/PSSCH) occasion to monitor for a sidelink transmission from a second UE;
receiving, during the PSCCH/PSSCH occasion, a sidelink discontinuous reception (DRX) command;
stopping monitoring of the PSCCH for the PSCCH/PSSCH occasion in response to the sidelink DRX command;
informing the second UE of a duration of a DRX active state for a link with the base station in response to being in the DRX active state for the link with the base station; and
monitoring the PSCCH for the duration of the DRX active state.

9. The method of claim 8, wherein informing the second UE of the duration of the DRX active state comprises informing the second UE of a remaining duration of the DRX active state after a prohibition time measured from the sidelink DRX command.

10. The method of claim 8, further comprising receiving PSCCH and PSSCH from the second UE during the duration of the DRX active state.

11. An apparatus for wireless communication for a first user equipment (UE), comprising:
a memory storing computer-executable instructions; and
at least one processor coupled to the memory and configured to execute the computer-executable instructions to:
identify, based on a sidelink resource configuration from a base station, a physical sidelink control/shared channel (PSCCH/PSSCH) occasion to monitor for a sidelink transmission from a second UE;
receive, during the PSCCH/PSSCH occasion, a sidelink discontinuous reception (DRX) command; and
stop monitoring of the PSCCH for the PSCCH/PSSCH occasion in response to the sidelink DRX command, wherein the at least one processor is configured to monitor a physical downlink control channel (PDCCH) and not monitor the PSCCH in response to being in a DRX active state for a link with the base station.

12. The apparatus of claim 11, wherein the at least one processor is configured to enter a sleep mode in response to not being in a DRX active state for a link with the base station.

13. The apparatus of claim 11, wherein the at least one processor is configured to inform the base station that a portion of the PSCCH/PSSCH occasion is unused in response to not being in a DRX active state for a link with the base station.

14. The apparatus of claim 11, wherein the at least one processor is configured to:
inform the second UE of a duration of a DRX active state for a link with the base station in response to being in the DRX active state for the link with the base station; and
monitor the PSCCH for the duration of the DRX active state.

15. The apparatus of claim 14, wherein the at least one processor is configured to inform the second UE of a remaining duration of the DRX active state after a prohibition time measured from the sidelink DRX command.

16. The apparatus of claim 14, wherein the at least one processor is configured to receive PSCCH and PSSCH from the second UE during the duration of the DRX active state.

17. The apparatus of claim 11, wherein the sidelink DRX command is a sidelink control information (SCI).

18. The apparatus of claim 11, wherein the sidelink DRX command is a sidelink media access control (MAC) control element (CE).

19. An apparatus for wireless communications at a first user equipment, comprising:
means for determining, based on a sidelink resource configuration from a base station, a physical sidelink control/shared channel (PSCCH/PSSCH) occasion to monitor for a sidelink transmission from a second UE;
means for receiving, during the PSCCH/PSSCH occasion, a sidelink discontinuous reception (DRX) command; and
means for stopping monitoring of the PSCCH for the PSCCH/PSSCH occasion in response to the sidelink DRX command, wherein the means for stopping monitoring of the PSCCH is configured to monitor a physical downlink control channel (PDCCH) and not monitoring the PSCCH in response to being in a DRX active state for a link with the base station.

20. The apparatus of claim 19, wherein the means for stopping monitoring of the PSCCH is configured to determine to enter a sleep mode in response to not being in a DRX active state for a link with the base station.

21. The apparatus of claim 19, further comprising means for informing the base station that a portion of the PSCCH/PSSCH occasion is unused in response to not being in a DRX active state for a link with the base station.

22. The apparatus of claim 21, wherein the means for informing the base station that the portion of the PSCCH/PSSCH occasion is unused is configured to transmit a scheduling request informing the base station that the portion of the PSCCH/PSSCH occasion is unused when the first UE has uplink data to transmit to the base station, the apparatus further comprising means for transmitting an uplink transmission on unused resources of the PSCCH/PSSCH occasion.

23. The apparatus of claim 21, further comprising:
means for receiving a DRX command from the base station; and
means for entering a sleep mode in response to the DRX command.

24. The apparatus of claim 19, further comprising:
means for informing the second UE of a duration of a DRX active state for a link with the base station in response to being in the DRX active state for the link with the base station; and
means for monitoring the PSCCH for the duration of the DRX active state.

25. The apparatus of claim 24, wherein the means for informing the second UE of the duration of the DRX active state is configured to inform the second UE of a remaining duration of the DRX active state after a prohibition time measured from the sidelink DRX command.

26. The apparatus of claim 24, further comprising means for receiving PSCCH and PSSCH from the second UE during the duration of the DRX active state.

27. A non-transitory computer-readable medium storing computer executable code, the code when executed by a processor of a first user equipment (UE) causes the processor to:
determine, based on a sidelink resource configuration from a base station, a physical sidelink control/shared channel (PSCCH/PSSCH) occasion to monitor for a sidelink transmission from a second UE;
receive, during the PSCCH/PSSCH occasion, a sidelink discontinuous reception (DRX) command; and
stop monitoring of the PSCCH for the PSCCH/PSSCH occasion in response to the sidelink DRX command, wherein the code to stop monitoring of the PSCCH includes instructions to monitor a physical downlink control channel (PDCCH) and not monitor the PSCCH in response to being in a DRX active state for a link with the base station.

28. The non-transitory computer-readable medium of claim 27, further comprising code to inform the base station that a portion of the PSCCH/PSSCH occasion is unused in response to not being in a DRX active state for a link with the base station.

29. The non-transitory computer-readable medium of claim 27, further comprising code to:
inform the second UE of a duration of a DRX active state for a link with the base station in response to being in the DRX active state for the link with the base station; and
monitor the PSCCH for the duration of the DRX active state.

* * * * *